United States Patent Office 3,316,194
Patented Apr. 25, 1967

3,316,194
POLYSULFIDE POLYMER COMPOSITION
AND METHOD
Dana C. Payne, Redwood City, and Frank D. Gaus, Lafayette, Calif., assignors to Frank D. Gaus, doing business as Superior Products Company, Oakland, Calif.
No Drawing. Filed Mar. 18, 1963, Ser. No. 266,074
9 Claims. (Cl. 260—28)

This invention relates to a novel method for greatly improving the resistance to heat of polysulfide sealants. Another object of this invention is to reduce the tendency of such sealants to revert or lose their rubber-like qualities. A further object of this invention is to permit great variation in the speed of cure of polysulfide sealants.

The invention possesses other objects and features of advantage, some of which of the foregoing will be set forth in the following description of the preferred form of the invention. It is to be understood, however, that variations in the description and examples may be adopted within the scope of the invention as set forth in the claims.

One of the important uses for this invention is for compositions to be used for joint sealers in concrete pavements. The compositions are eminently suitable as sealents for aircraft runways which are subjected to hot blasts from jet engines and spillage of jet fuel.

Polysulfide sealants have been used for joint sealers and such type compounds are described in U.S. Patent 2,910,922 (Horning, November 3, 1959). These compositions of coal tar and liquid polysulfide require large amounts of polysulfide and fillers to give adequate physical properties, are relatively slow curing, and have limited resistance to heat. All of these deficiencies are vastly improved by the practice of the invention described herein.

Compositions of this invention are essentially combinations of:

(1) A liquid polysulfide having vulcanizable thiol terminals and the general formula HS(—R—S—S—)$_n$RSH where $n$ is an integer from 3 to 200 or more and R is an organic radical chosen to give either a linear or branched structure. (Refer to article published in Industrial and Engineering Chemistry, Volume 43, page 324, February 1951, and U.S. Patent 2,466,963, April 12, 1949, Patrick and Ferguson). A good range for $n$, supra, is about 10 to 70, with about 20 to 45 being preferred, and about 24 being optimum.

(2) A solid, high molecular weight (polymeric) polysulfide with essentially non-reactive terminals having the general formula

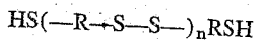

and concerning which a more detailed description follows; a vulcanizing agent which can react with the thiol terminals of the liquid polysulfide in such a manner as to cause vulcanization, such materials in general being those described by Patrick et al., 2,466,963, Column 30, with lead peroxide being preferred. It is most often necessary to include in the formulation one or more auxiliary materials which can promote coblending of the solid and liquid polysulfides, and many such materials and combinations fall within the scope of this invention, i.e., using a water dispersion of the solid polysulfide, liquid coal tar is a suitable agent to permit co-blending of the two polysulfides. Fillers, pigments, retarders, etc., which are commonly used in liquid polysulfide formulations may also be used; however, their use is not nearly as important with this invention as with previous formulations; this will be discussed, more fully in following sections.

It has been discovered and is the essential feature of this invention that the inclusion of the solid, high molecular weight (polymeric) polysulfide polymer into the sealant formulation imparts unexpected properties. Such polymers are reported by their manufacturer to be non-reactive and have limited stability to heat. However, it was found that the use of such polymers is conventional polysulfide sealant formulations, in a manner described herein, vastly speed the rate of cure, improved hardness and resilience, and increased the heat resistance beyond that exhibited by either polymer by itself.

The solid, high molecular weight (polymeric), polysulfide polymers of this invention are commercially available in solid form and as water dispersions of solid polysulfide polymers having the general formula

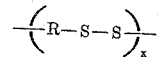

They are described in an article by Fettes and Jorczak, Industrial and Engineering Chemistry, volume 42, November 1950, page 2217; also see U.S. Patent 2,465,512 (Carasso, March 29, 1949). These polymers do not contain active terminals and do not respond to vulcanization with oxidizing agents. Chemically the polymers are defined as condensation products of an alkaline polysulfide and suitable poly halides. In the preferred form as water dispersions or latices two such commercial polymers are known as and based on the following dihalides.

| Commercial designation: | Polyfunctional halides used |
|---|---|
| WD6 | Ethylene dichloride, propylene dichloride. |
| WD2 | Dichloroethyl formal, trichloropropane. |

The above two compositions of solid polysulfides are not intended to limit the scope of this invention. Nor is the invention limited to the use of water dispersions. The limiting considerations are that the terminal groups of the polymer molecules be other than mercaptan, the coagulated and dried polymer be solid at room temperature, and by suitable techniques the polymer be soluble in combination with a thiol terminated, vulcanizable liquid polysulfide and that the formulation before vulcanization be a liquid. For the purposes of this invention, the word solid refers to the physical condition of the polymer at room temperature (i.e. 65–80° F.) wherein the viscosity under low rates of shear (i.e. about 0.12 inch per minute) is over 15,000 poise.

The water dispersed or latex form of the solid polysulfide is preferred for convenience. It is posisble to use solid polysulfides as such but these are usually more difficult and costly to blend with the liquid polysulfide. In the latter case, the solid polymer may be converted to a water dispersion by mechanical means using techniques well known to those skilled in the art, or the solid polysulfide may be first dissolved in a suitable solvent and the solution then added directly to the liquid polysulfide or added in a manner similar to the water dispersions. It is possible to have solid polymer compositions which can only be used in either solvent or water dispersed form due to the physical or chemical nature of the polymer. For example, polysulfide polymers made from polyfunctional halides having three or more halides per molecule are increasingly less soluble in solvents as the resulting branched and cross-linked network is increased. These polymers are therefore more adaptable to use as water dispersions. On the other hand, it is possible to prepare polysulfide polymers of low molecular weight or containing hydrophillic groups such that a usable latex or water dispersion is not practical. In this case, solvent solution or dispersion is the preferred form.

Using the preferred form of the solid polysulfide, i.e., as a water dispersion, it is necessary to use a material which is a solvent for the liquid polymer and water of the dispersion, and which the solid polymer is soluble or can be solubilized with heat. The preferred mutual solvent is coal tar or suitable fractions thereof; however, other mutual solvents are within the scope of this invention.

The formulations may contain a minimum of about ½% by volume of solid polysulfide. The maximum is hardly meaningful as this will depend on the molecular weight of the polymer and extent to which it is broken down in the course of blending with the mutual solvent or the liquid polymer. Two to seven percent by volume along with 20 to 40% by volume of reactive polysulfide and the remainder coal tar makes a sealant which when vulcanized with lead peroxide is highly satisfactory for use as a pavement sealant. Experience has shown that reactive polysulfide should be present in at least 10% by volume.

Inert or reinforcing fillers such as clays, talc, etc., may also be used in the formulation, however, one of the advantages of the instant invention is that the compounds are firm, resilient, and resistant to heat without fillers. Furthermore, extraction of the extending or mutual solvent by contact with jet fuel or solvents is often accompanied by brittleness of the surface when fillers are used; therefore, it is desirable to keep fillers to a minimum and herein is an important advantage to this invention.

The combination of the solid and liquid polysulfides gives rapid curing when the preferred vulcanizing agent lead peroxide is present. It is therefore necessary to add the curing agent at about the same time the sealant or compound is to be used. Accordingly, and as understood and practiced in this art, see for example U.S. Patent 2,910,922, supra, the liquid polysulfide and curing agent are included in separate components for admixing at the job site where the sealant compound is installed. The amount of lead peroxide used is not critical and is usually about 10% by weight of the liquid mercaptan terminated polymer. The vulcanizing agent is not critical to the invention and may be any substance which will condense with or catalyze the condensation of the mercaptan hydrogens of the liquid polymer.

Cure rate of compositions prepared according to this invention may be varied over a wide range by changing the amount of either or both vulcanizing agent and solid polysulfide. The latter is so effective in increasing heat resistance and cured resilience of the composition that it is permissible to vary the amount of vulcanizing agent and hence the cure rate over a wide range. Heat resistance, hardness, resilience, and cure rate increase with increasing amounts of solid polysulfide used.

The following examples illustrate the advantages to be gained from this invention.

*Example 1*

The following example demonstrates the basic advantages of this invention, i.e., rapid and thorough cure, and heat stability. Components are blended in the order shown.

| | Composition, Percent by Volume | |
|---|---|---|
| | A | B |
| Liquid Polysulfide (LP-2) | 33. | 28. |
| Coal tar, 7 to 15 poise viscosity at 77° F | 58.33 | 58.33 |
| Water | 7. | 0 |
| Solid Polysulfide water dispersion (WD6, 50% solids) | 0 | ¹ 12. |
| Clay filler | 1.3 | 1.3 |
| Vulcanizing agent (lead dioxide) | .37 | .37 |
| Total | 100.00 | 100.00 |
| Time to initial set, minutes | 19 | 9 |
| Resilience, after the following cure: | | |
| One day at 77° F., Percent | 54 | 75 |
| Four days at 77° F., Percent | 40 | 75 |
| Resilience after heat aged at 158° F. in air for the following period: | | |
| 24 hours, Percent | 10 | 72 |
| 168 hours, Percent | 0 | 73 |

¹ 5% solids, 7% water.

Composition A is typical of technology prior to this invention; and, although it contains the same total content of polysulfide as Composition B, the properties of the former are vastly inferior. Virtually all rubber-like and sealant qualities are lost as a result of short term heat exposure.

Composition B is a practical compound which has been used commercially to seal thousands of feet of joints in aircraft runways and highway pavements. The temperature of such joints often reaches 160° F. due to heat absorbed from the sun, and the ability of compounds like Composition B to retain their rubber-like qualities has been demonstrated in practice.

The increased speed of cure of Composition B has proven to be an advantage in those instances where it is desired to avoid excessive loss of sealant at the bottom of the joint being sealed.

*Example 2—Other solid polymers—water dispersions*

Replacing the solid polymer dispersion of Composition B, Example 1, with another commercial dispersion WD2, essentially the same results are obtained; however, the method of mixing in this case is different. WD2 is preferably added to and dispersed in the coal tar (using heat) prior to adding the liquid polysulfide LP-2. This procedure change is necessary due to the chemical nature of the solid WD2 polymer.

*Example 3—Other Polymers—solid polysulfides*

WD6 of Composition B, Example 1, is replaced with solid polysulfide Thiokol FA (in ethylene dichloride solution). Results obtained are similar to that described in Example 1, Composition B.

*Example 4—Effect of quantity of solid polysulfide*

If in Composition B, Example 1, the quantity of WD6 is reduced from 12 volume percent to 10.2 volume percent the major change in results is a drop-off in original and aged resilience to 60% and 63% (24 hours at 158° F.) respectively. Further reductions in solid polysulfide result in corresponding reductions, particularly in the heat aged properties; however, even at the lowest level claimed to be effective, i.e., about ½ volume percent, a measurable improvement can be demonstrated over a corresponding compound without solid polysulfide polymer.

We claim:
1. An elastomeric composition comprising the homogeneous vulcanized product of thiol terminated liquid polysulfide, solid non-thiol terminated polymeric poly- sulfide formed as the reaction product of a polyhalide and alkaline polysulfide, and coal tar.

2. A composition as defined in claim 1, wherein said solid polysulfide is in the form of a water based dispersion.

3. A composition as defined in claim 1, wherein said liquid polysulfide is contained in the proportion of at least about 10% taken by volume and said solid polysulfide is contained in the proportion of at least about ½% taken by volume.

4. An elastomeric composition according to claim 3 where the liquid polysulfide has the formulae HS $$(-R-S-S-)_n RSH$$

where $n$ is 3 to 200 and R is chosen to give either a linear or branched structure.

5. A composition as defined in claim 1, wherein said liquid polysulfide has the formula $HS(-R-S-S-)_n RSH$ where $n$ is about 20 to about 45.

6. A composition as defined in claim 5, wherein said solid polysulfide is in the form of a water based dispersion and the following ingredients are contained in approximately the following proportions:

| | Percent by volume |
|---|---|
| Liquid polysulfide | 28 |
| Coal tar | 58 |
| Solid polysulfide water dispersion (5% solids, 7% water) | 12 |

7. The method of improving the elastomeric properties of a vulcanized liquid polysulfide having vulcanizable thiol terminals which consists in admixing with the liquid polysulfide prior to vulcanizing a solid non-thiol terminated polymeric polysulfide formed as the reaction product of polyhalide and alkaline polysulfide.

8. The method of improving the elastomeric properties of a vulcanized liquid polysulfide and coal tar elastomer which consists in admixing with the liquid polysulfide and coal tar prior to vulcanizing, of at least about ½% solid non-thiol terminated polymeric polysulfide formed as the reaction product of polyhalide and alkaline polysulfide parts taken by volume.

9. The method as is defined in claim 8 wherein said solid non-thiol terminated polymeric polysulfide is in a water dispersion.

References Cited by the Examiner

UNITED STATES PATENTS

| 2,195,380 | 3/1940 | Patrick | 260—79.1 |
| 2,278,127 | 3/1942 | Patrick | 260—79.1 |
| 2,363,614 | 11/1944 | Patrick | 260—79.1 |
| 2,465,512 | 3/1949 | Carasso | 260—823 |
| 2,676,165 | 4/1954 | Fettes | 260—79.1 |
| 2,910,922 | 11/1959 | Horning | 260—79.1 |
| 2,957,845 | 10/1960 | Wesp | 260—79.1 |
| 3,038,883 | 6/1962 | Forman | 260—79.1 |

DONALD E. CZAJA, *Primary Examiner.*

LEON J. BERCOVITZ, M. I. MARQUIS,
*Assistant Examiners.*